United States Patent [19]
Ishikawa et al.

[11] Patent Number: 5,892,469
[45] Date of Patent: Apr. 6, 1999

[54] TIME DIVISION MULTIPLEXING TRANSMITTER AND DECODING CIRCUIT USED FOR SAID TRANSMITTER AND METHOD FOR TIME DIVISION MULTIPLEXING TRANSMISSION

[75] Inventors: Hajime Ishikawa; Tetsuyuki Suzaki, both of Tokyo, Japan

[73] Assignee: NEC Corporation, Japan

[21] Appl. No.: 955,387

[22] Filed: Oct. 21, 1997

Related U.S. Application Data

[62] Division of Ser. No. 579,613, Dec. 26, 1995, Pat. No. 5,757,800.

[30] Foreign Application Priority Data

Dec. 27, 1994 [JP] Japan .................................. 6-326280

[51] Int. Cl.$^6$ .................................................. H03M 7/00
[52] U.S. Cl. .................................................. 341/63
[58] Field of Search .............................. 341/63, 51, 59, 341/67, 102, 103, 141; 370/441, 479, 528

[56] References Cited

U.S. PATENT DOCUMENTS 5,748,122  5/1998  Shinagawa et al. .................. 341/67
5,757,800  5/1998  Ishikawa et al. .................... 370/441

FOREIGN PATENT DOCUMENTS 4-291840  10/1992  Japan .

OTHER PUBLICATIONS

H. Ishikawa, et al., "Study on Large–Capacity Digital Video Distribution System—Development on Time Division Data Multiplexing and Distribution Method With Compact 10Gbps Optical Terminal", Technical Report of IEICE, EMCJ94–49 (1994–11), pp. 1–6.

Primary Examiner—Brian Young
Attorney, Agent, or Firm—Ostrolenk, Faber, Gerb & Soffen, LLP

[57] ABSTRACT

The present invention generates a reference signal including identification information based on a first coding method and generates data signals by a second coding method different from the first coding method. Next, it time division multiplexes signals by allocating the reference signal to a reference time slot and allocating data signals to time slots of which phase difference between the reference time slot is predetermined, and sends a multiplexed signal. In a receiver side, the reference time slot is detected based on identification information in a transmitted signal.

1 Claim, 7 Drawing Sheets

TIME DIVISION MULTIPLEXING TRANSMITTER AND DECODING CIRCUIT USED FOR SAID TRANSMITTER AND METHOD FOR TIME DIVISION MULTIPLEXING TRANSMISSION

This is a division of application Ser. No. 08/579,613, filed Dec. 26, 1995 now U.S. Pat. No. 5,757,800.

BACKGROUND OF THE INVENTION

The present invention relates to an art of a time division multiplexing transmitter for transmitting time division multiplexed data, and more particularly, to an art for identifying a time slot of a reference channel contained in the multiplexed signal to extract a desired channel based on the phase difference between the time slots.

In order to select and extract a desired channel from among signals in which data of multiple channels are time division multiplexed, the time slot phase of the desired channel has to be identified.

Assuming that N (positive integer) channels are multiplexed, some of those channels are used as reference channels for identifying the time slot phase. A receiver side detects the reference channel from among the multiplexed signals and identifies the time slot phase. Based on a predetermined relative phase between the reference channel and the channel to be extracted, the desired channel is extracted.

Figure 9:
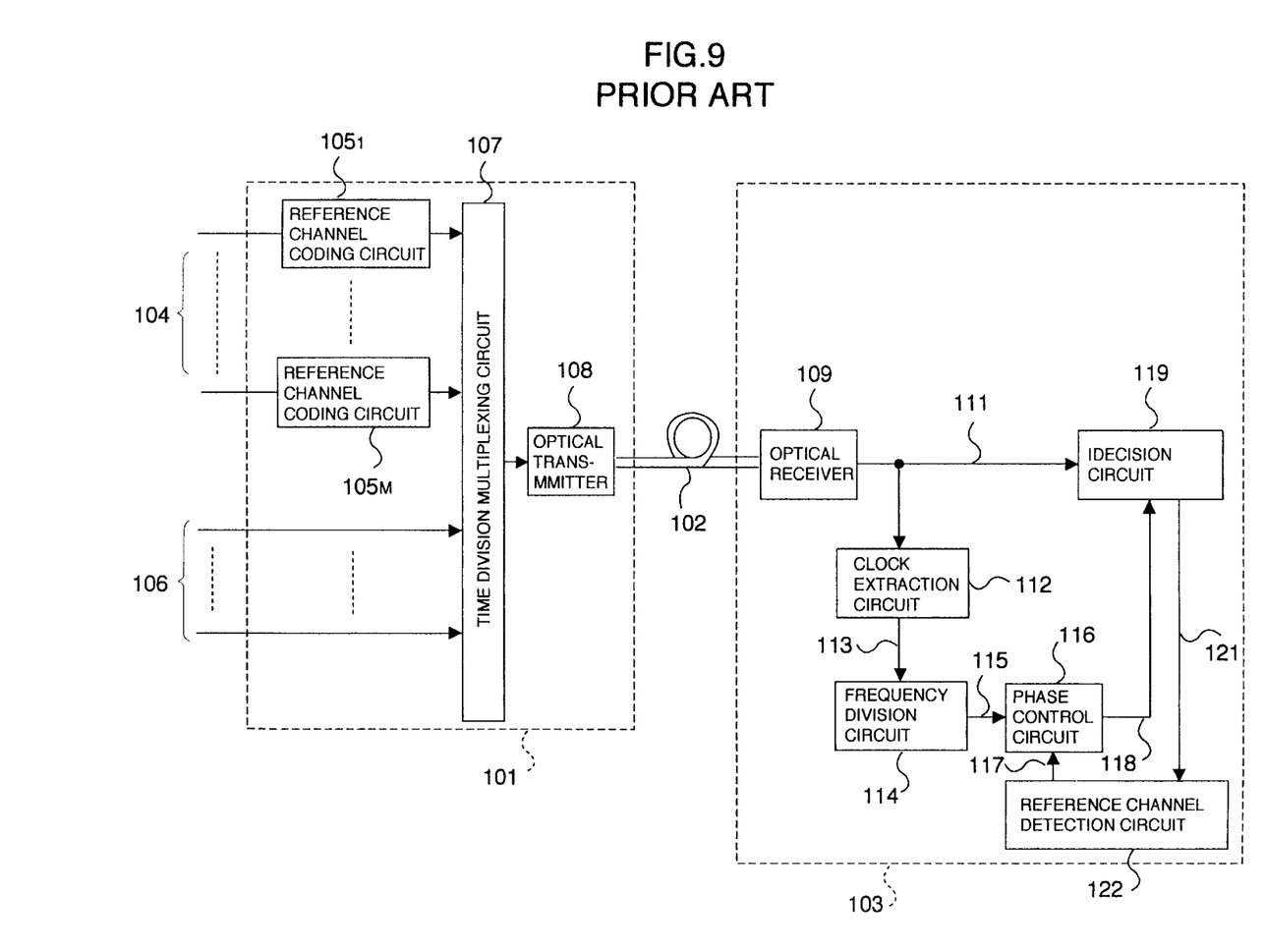
FIG. 9 is a block diagram of a construction of a conventional time division multiplexing transmitter.

FIG. 9 is a schematic view of a construction of a conventional time division multiplexing transmitter disclosed in a paper titled "Study on large-capacity digital video distribution system to Development on time division data multiplexing and distribution method with compact 10 Gbps optical terminal" written by Hajime ISHIKAWA et al. on "Technical Report of IEICE (EMCJ94-49(1994-11))".

The time division multiplexing transmitter comprises a transmission unit 101 for time division multiplexing data of N channels and converting the same into optical signals for transmission, an optical fiber 102 as a transmission path and a receiving unit 103 for extracting the desired channel among received signals for outputting.

The transmission unit 101 is described in detail.

Data 104 of M (M is a positive integer, $M \leq N$) channels of N channels are input to reference channel signal generators $105_1$ to $105_M$, respectively. The rest of the data signals 106 of (N–M) channels are input to a time division multiplexing circuit 107.

The reference channel signal generators $105_1$ to $105_M$ are circuits for adding a different bit pattern as identification information to each data signal for transmission. The time division multiplexing circuit 107 time division multiplexes M data signals output from the reference channel signal generators $105_1$ to $105_M$ and data signals 106. An optical transmitter 108 is a circuit for converting a signal output from the time division multiplexing circuit 107 into an optical signal for transmission.

The receiving unit 103 is described in detail.

An optical receiver 109 receives the optical signal transmitted from the optical transmitter 108 via the optical fiber 102. The optical signal is further converted into an electric signal 111. A clock extraction circuit 112 is a circuit for inputting the electric signal 111 and extracting a clock signal 113 at a frequency corresponding to the resultant bit rate. A frequency divider circuit 114 is a circuit for outputting a signal 115 obtained by frequency dividing the clock signal 113 into 1/k (k: natural number and prime in relation with M). A phase control circuit 116 is a circuit for outputting a synchronous signal 118 having a phase shifted from that of the signal 115 by the amount defined based on a phase control signal 117.

An decision circuit 119 is a circuit for extracting the data contained in the time slot having the phase corresponding to the synchronous signal 118 from the electric signal 111. Data signals 121 of one channel extracted by the decision circuit 119 are output to a reference channel detection circuit 122. The reference channel detection circuit 122 is a circuit for determining if a predetermined bit pattern as identification information is contained in the input data signals 121.

In order to detect the reference channel from among the multiplexed data signals, phase of the phase control circuit 116 is sequentially changed and data signal at every time slot is sent to the reference channel detection circuit 122. When detecting a reference channel generated by any one of the reference channel signal generators $105_1$ to $105_M$ of the transmission unit 101, the reference channel detection circuit 122 identifies the phase of the synchronous signal as the reference channel phase. In order to extract a desired channel from among N channels, the phase control circuit 116 is designed to output a synchronous signal obtained by adding phase difference between the reference channel and desired channel to the reference channel phase.

Another conventional time division multiplexing transmitter has been disclosed in Japanese Patent Laid Open No. 291840 (1992), which is constructed such that a channel phase is determined by detecting a specific bit pattern for frame synchronization at each channel multiple times for protecting synchronization. In this prior art, frequency of bit pattern non-conformity is subtracted from frequency of the bit pattern conformity. If the resultant subtraction value is 5 or greater, synchronization state is detected.

In the above-mentioned conventional time division multiplexing transmitters, specific bit pattern as identification information is added to each reference channel, which is detected by a receiver side for determining the reference channel phase. Since the transmission data can use any bit pattern, the channel other than the reference channel may have the same bit pattern as that of the identification information, resulting in misidentifying such channel as the reference channel. Therefore it is necessary to provide rear protection for determining the reference channel after detecting the bit pattern as the identification information multiple times. The above process unnecessarily extends the time for determining the reference channel phase. In case a code error of the identification information occurs during transmission, the bit pattern is not detected correctly, thus deviating from synchronization.

SUMMARY OF THE INVENTION

It is an object of the present invention to provide solutions for the aforementioned problems.

It is another object of the present invention to provide an art time division multiplexing transmission enabling to identify a reference channel correctly and in a short time.

The object of the present invention is achieved by a time division multiplexing transmitter comprising:
 a transmission unit having:
  first coding means for generating a reference signal including identification information based on a predetermined coding method;
  second coding means for generating a data signal of each channel by coding data for the each channel based on a coding method different from the predetermined coding method;

time division multiplexing means for generating a transmission signal by allocating the reference signal to a reference time slot, allocating the data signal of the each channel to each time slot of which phase difference between the reference time slot is predetermined for the each channel, and time division multiplexing the reference signal and the data signal; and a reception unit having reference time slot detection means for detecting the reference time slot by detecting the identification information from the transmission signal.

Moreover, the object of the present invention is achieved by a time division multiplexing method comprising:

a first coding step of generating a reference signal including identification information based on a predetermined coding method;

a second coding step of generating a data signal of each channel by coding data for the each channel based on a coding method different from the predetermined coding method;

a step of generating a transmission signal by allocating the reference signal to a reference time slot, allocating the data signal of the each channel to each time slot of which phase difference between the reference time slot is predetermined for each channel, and time division multiplexing all of allocated signals;

a step of transmitting the transmission signal;

a step of receiving the transmission signal; and a reference time slot detection step of detecting the reference time slot by detecting the identification information from among the transmission signal.

In the present invention, the reference signal is coded by a predetermined coding method. Since the transmission data are coded by coding method other than those used for the reference signal, and detecting the reference signal code enables detection of the time slot of the reference signal without misidentification. The phase difference between time slot of a desired channel and time slot of the reference channel is predetermined, allowing to extract a desired channel data based on the phase difference.

In addition, the present invention makes codes used for a plurality of reference signals different from others, so it is possible to uniquely identify a reference signal.

The object of the invention is achieved by a decoding circuit for decoding a fixed bit length transmission information having an identification bit string consisting of a continuous repetition of one value of two values and data bit string consisting of a bit string made of the two values wherein a content of the bit string varies according to data to be transmitted, the decoding circuit comprising:

means for sequentially inputting the fixed bit length transmission information and parallel developing the bit strings of the fixed bit length transmission information;

a plurality of continuity detection means, each of the continuity detection means for sequentially inputting parallel developed bits and detecting whether a predetermined same value is continuously repeated in a predetermined times in the input bits; and means for extracting bits which are detected by the continuity detection means that a predetermined same value is not continuously repeated in a predetermined times in the input bits, and outputting the extracted bits as the data bit string.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

The preferred embodiments of the present invention are hereinafter described in detail.

Figure 1:
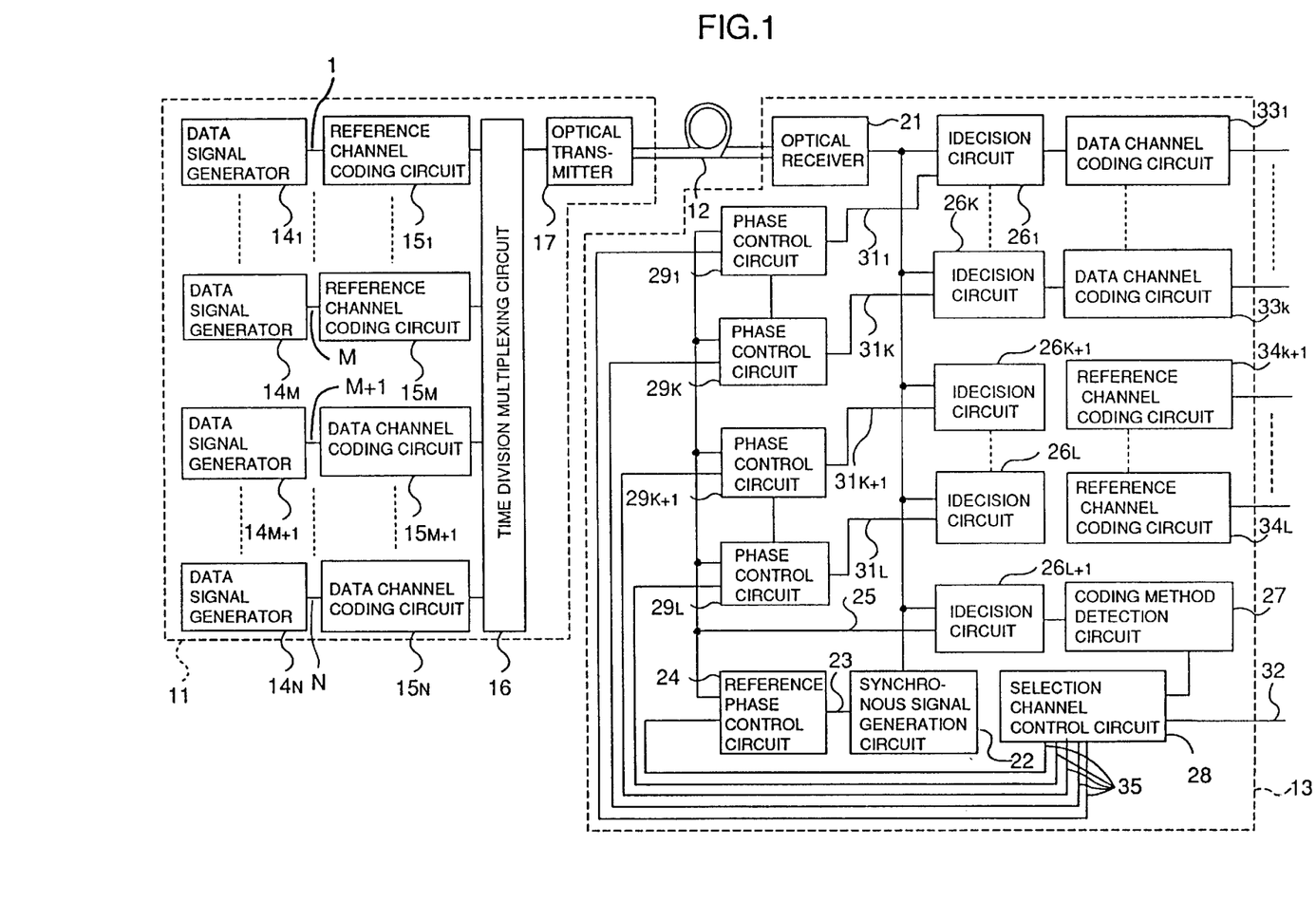
FIG. 1 is a block diagram showing a construction of a time division multiplexing unit of an embodiment of the present invention.

FIG. 1 is a schematic view of a construction of a time division multiplexing transmitter of an embodiment of the present invention.

This time division multiplexing transmitter comprises a transmission unit 11 for time division multiplexing data of multiple channels and transmitting the same as an optical signal, an optical fiber 12 as a transmission path and a receiving unit 13 for converting the received optical signal into an electric signal and extracting each channel.

The transmission unit 11 is provided with N (N is a positive integer) units of data signal generators $14_1$ to $14_N$ for generating transmission data signal. Data signals of M (M is a positive integer, M≦N) units of the data signal generators $14_1$ to $14_M$ are input to reference channel coding circuits $15_1$ to $15_M$. While data signals of (N−M) data signal generators $14_{M+1}$ to $14_N$ are input to data channel coding circuits $15_{M+1}$ to $15_N$.

The reference channel coding circuits $15_1$ to $15_M$ code the data signals 1 to M based on the first coding method used for the reference channels.

The data channel coding circuits $15_{M+1}$ to $15_N$ code data signals M+1 to N based on the second coding method used for the channels other than the reference channels.

The data signals 1 to N are input to a time division multiplexing circuit 16 for time division multiplexing.

Figure 2:
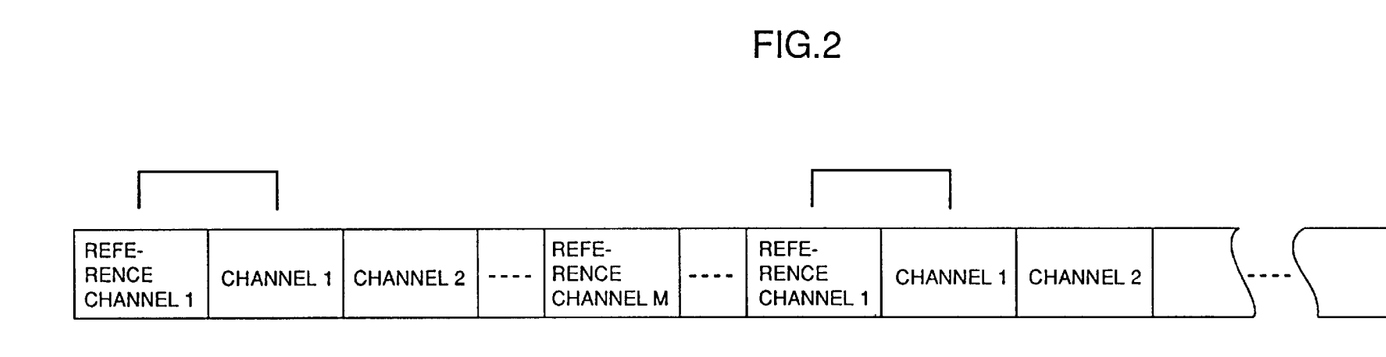
FIG. 2 is a figure for explaining a time slot used in the present invention.

While time division multiplexing, each channel's data signal is allocated to a time slot so as the phase difference between a reference channel is always constant for each channel. As shown in FIG. 2, for example, if assuming that the phase difference between the channel 1 and the reference channel is 1, the data signal of the channel 1 is allocated to a time slot so as the phase difference between the time slot of the channel 1 and the time slot of the reference channel is 1.

The multiplexed signals are input to an optical transmitter 17 where they are converted into optical signals and transmitted to the optical fiber 12.

Next, the above-mentioned first coding method and the second coding method are explained.

In this embodiment, the second coding method uses 8B10B coding method.

The 8B10B coding method is a method to convert an incoming 8 bit pattern into a corresponding 10 bit pattern which has been predetermined. With this mode, the mark ratio of the 10 bit code is set to fall into a predetermined range. The 10 bit data combination has $2^{10}$ patterns. However the 8B10B coding limits the combination such that the mark ratio is ranged from 4/10 to 6/10 as the effective characters. The 8B10B coding specifies a forbidden rule of maximum run length. In this case, the maximum number is specified to 5. So the bit pattern including 6 or more consecutive bits either "1"s or "0"s is never used.

The first coding method codes the input data by using the code having the bit pattern other than that used in the second coding method. For example, the mark ratio is specified to be either 3/10 or less, or 7/10 or more. Alternatively the bit pattern is set to deviate from the forbidden rule specifying the maximum run length. For example, the bit pattern is set to have 6 or more consecutive "0"s or "1"s.

The reference channel coding circuits $15_1$ to $15_M$ serve to code so as to identify the channel corresponding to the coded data. For example, each mark ratio of the data coded by the respective reference channel coding circuit is different from each other. The maximum run length is made different from each other in the range of "6" or more.

The optical receiver 21 of the receiving unit 13 forms a circuit part for converting the optical signal transmitted through the optical fiber 12 into an electric signal. The converted electric signal is input to the synchronous signal generation circuit 22.

The synchronous signal generation circuit 22 extracts a clock signal corresponding to the bit rate from the converted electric signal and outputs a channel synchronous signal 23 which is generated by frequency dividing the clock signal with the number of multiplexed channels N. The channel synchronous signal 23 is input to a reference phase control circuit 24.

The reference phase control circuit 24 is a circuit for changing the phase of the channel synchronous signal 23. Changing the phase enables to output a synchronous signal 25 having the phase synchronizing to that of the desired channel to an decision circuit $26_{L+1}$.

The synchronous signal 25 and an electric signal output from the optical receiver 21 are input to the decision circuit $26_{L+1}$. The decision circuit $26_{L+1}$ extracts the data signal of one time slot based on the input synchronous signal 25. The data signal of one channel extracted by the decision circuit $26_{L+1}$ is input to a coding method detection circuit 27.

The coding method detection circuit 27 determines if the bit pattern of the input data signal is the data coded by the first coding method. In this circuit, the specific reference channel is distinguished from another among data coded with the first coding method based on the difference in the mark ratio or difference in the maximum run length. A result is output to the selection channel control circuit 28.

The selection channel control circuit 28 controls the phase shift variation amount caused by the reference phase control circuit 24 based on the detection results of the coding method detection circuit 27. The phase of the synchronous signal 25 is adjusted so that any one of the reference channel is detected.

Determining the coding method of the extracted data signal through the decision circuit $26_{L+1}$ provides the synchronous signal 25 with its phase conforming to that of the reference channel.

The synchronous signals 25, of which phase is conforms to the phase of the reference channel that is output from the reference phase control circuit 24, are input to the phase control circuits $29_1$ to $29_L$, respectively.

The phase control circuits $29_1$ to $29_L$ have the same construction as that of the reference phase control circuit 24, change the phase of the input synchronous signal 25 based on a control signal 35 described later and outputs selection channel synchronous signals $31_1$ to $31_L$.

The electric signal output from the optical receiver 21 are branched and input to the decision circuits $26_1$ to $26_L$, respectively. The selection channel synchronous signals $31_1$ to $31_L$ are input to the corresponding decision circuits $26_1$ to $26_L$.

These decision circuits $26_1$ to $26_L$ have the same function as that of the decision circuit $26_{L+1}$, which serve to extract one channel data corresponding to the input selection channel signals $31_1$ to $31_L$.

The selection channel control circuit 28 receives a channel designation signal 32 which designates the channel to be output from the receiving unit 13. The selection channel control circuit 28 examines the phase difference between the designated channel and the reference channel detected by the coding method detection circuit 27. Control signals 35 for shifting the phase of the synchronous signal 25 by the obtained phase difference are further output to the respective phase control circuits $29_1$ to $29_L$.

The extracted data signal at every channel through the decision circuits $26_1$ to $26_L$ are input to data channel decoding circuits $33_1$ to $33_K$ and reference channel decoding circuits $34_{K+1}$ to $34_L$.

The reference channel decoding circuits $34_{K+1}$ to $34_L$ decode the data coded with the first coding method and output a result. They are used for a reference channel which includes data other than identification information.

The data channel decoding circuits $33_1$ to $33_K$ decode the data coded with the second coding method and output a result.

Described as above, the selection channel control circuit 28 changes the phase of the channel synchronous signal 23 by one time slot and causes the decision circuit $26_{L+1}$ to output each data of the respective time slots sequentially. At a time when the coding method detection circuit 27 detects the reference channel, the shift amount of the phase in the reference phase control circuit 24 is fixed. Since the phase difference between the reference channel and the respective channel is predetermined, the selection channel control circuit 28 outputs a control signal 35 in conformity with the phase difference based on the channel designation signal 32. The desired channel data is, thus extracted.

Like this, the first and the second coding methods are set not to use the same bit pattern with each other. Therefore detecting the bit pattern defined by either coding method ensures to distinguish the reference channel from other channels. This eliminates the continuous bit pattern conformity detection to avoid misidentification, thus reducing the time for determining the reference channel.

In case of one reference channel, it often takes a long time to obtain the time slot of the reference channel. The time for the rear protection further adds to the processing time. Conventionally a plurality of reference channels are set in order to reduce the processing time. While the present invention requires no rear protection, thereby reducing the time for detecting the reference channel as well as the number of the reference channels.

The coding method detection circuit 27 shown in FIG. 1 is described in detail.

Figure 3:
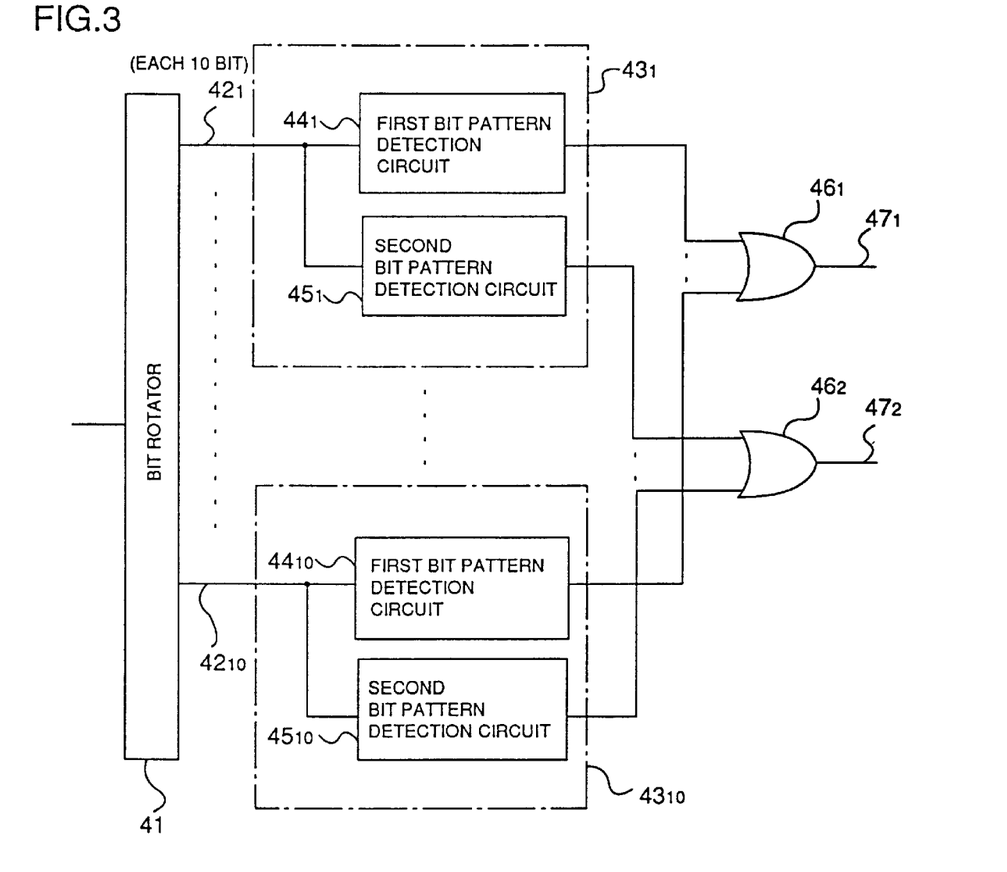
FIG. 3 is a block diagram of a construction of a coding method detection circuit for detecting a reference channel by comparing bit patterns.

FIG. 3 is a block diagram of a construction of the coding method detection circuit 27 for identifying the reference channel by detecting conformity in the bit pattern.

This case assumes that two reference channels are set in N channels by the reference channel coding circuit $15_1$ and the reference channel coding circuit $15_2$. The two reference channels use repetition of the 10 bit patterns which are not used in the 8B10B coding. Those two reference channels are coded into peculiar bit patterns which are different from each other. Channels other than the reference channels are coded with 8B10B coding.

The coding method detection circuit shown in FIG. 3 is so constructed to determine whether the time slot being extracted corresponds to the reference channel and to distinguish one reference channel from another.

The data signal of one channel extracted by the decision circuit $26_{L+1}$ shown in FIG. 1 is input to a bit rotator 41.

The bit rotator 41 is a circuit to convert incoming serial type data signals into different 10 bit parallel data $42_1$ to $42_{10}$ by shifting 1 bit. The parallel data $42_1$ to $42_{10}$ are input to bit pattern conformity detection circuits $43_1$ to $43_{10}$ respectively.

The bit pattern conformity detection circuits $43_1$ to $43_{10}$ comprise first bit pattern detection circuits $44_1$ to $44_{10}$ for detecting bit pattern of the first reference channel, and the second bit pattern detection circuits $45_1$ to $45_{10}$ for detecting bit pattern of the second reference channel.

Outputs of the first bit pattern detection circuits $44_1$ to $44_{10}$ are input to the first OR circuit $46_1$. Outputs of the second bit pattern detection circuits $45_1$ to $45_{10}$ are input to the second OR circuit $46_2$.

There are 10 kinds of bit patterns locating in parallel and shifted with each other. The desired 10 bit data conforming to the 10 bit pattern is detected irrespective of the head position thereof. When the decision circuit $26_{L+1}$ extracts the first reference channel, the data conform to one of the 10 parallel bit patterns. Therefore one of the first bit pattern detection circuits $44_1$ to $44_{10}$ outputs a high level signal representing the conformity of the bit pattern.

When one of the first bit pattern detection circuits $44_1$ to $44_{10}$ outputs the high level signal, the first OR circuit $46_1$ outputs a first detection signal $47_1$ representing the detection of the first reference channel.

When one of the second bit pattern detection circuits $45_1$ to $45_{10}$ outputs the signal representing conformity to each channel, the second OR circuit $46_2$ outputs a second detection signal $47_2$ representing the detection of the second reference channel.

The first detection signal $47_1$ and the second detection signal $47_2$ are input to the selection channel control circuit 28 as shown in FIG. 1. Based on those signals, the selection channel control circuit 28 identifies the reference channel being extracted by the decision circuit $26_{L+1}$.

Figure 4:
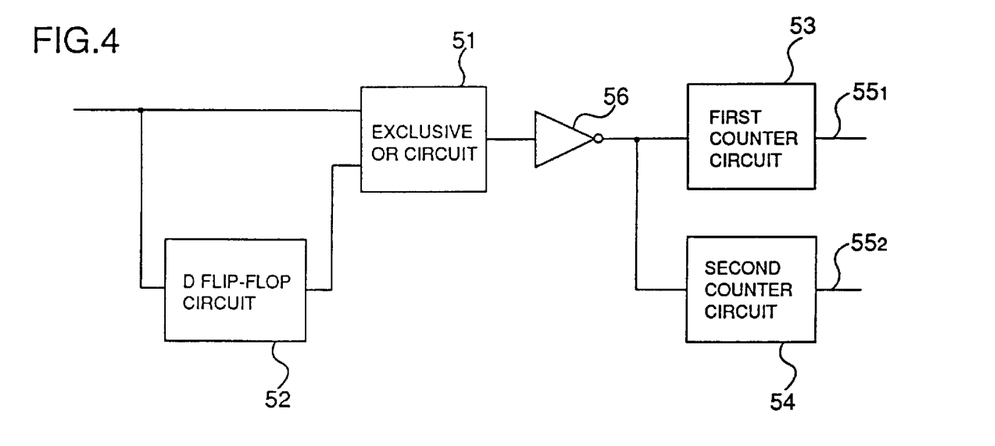
FIG. 4 is a block diagram of a construction of a coding method detection circuit for detecting a reference channel by using maximum run length.

FIG. 4 is a block diagram of a construction of the coding method detection circuit for detecting a reference channel based on the maximum run length.

In this case too, it is assumed that two reference channels are set in N channels by the reference channel coding circuit $15_1$ and the reference channel coding circuit $15_2$.

Since the maximum run length is specified to "5" in the 8B10B coding, the number of code continuity in the first reference channel is set to "6" and the number in the second reference channel is set to "7", distinguishing one reference channel from another. An example of the code of the first reference channel is expressed as follows:

"1111110000".

An example of the code of the second reference channel is expressed as follows:

"1111111000".

It is to be noted that channels other than the reference channels are coded with 8B10B coding.

Outputs of the decision circuit $26_{L+1}$ shown in FIG. 1 are branched and input to an exclusive OR circuit 51 and a D flip-flop circuit 52, respectively. Outputs of the D flip-flop circuit 52 are input to the exclusive OR circuit 51. Outputs of the exclusive OR circuit 51 are rotated with an inverse circuit 56, branched and input to the first counter circuit 53 and the second counter circuit 54, respectively.

The D flip-flop circuit 52 is so constructed to output the input data by delaying 1 bit. The exclusive OR circuit 51 outputs "0" only in case of consecutive "1"s or "0"s and the inverse circuit 56 outputs "1". The inverse circuit 56 outputs 5 consecutive "1"s in case of 6 consecutive "1"s or "0"s.

The first counter circuit is so constructed to output a first detection signal $55_1$ when the inverse circuit 56 outputs 5 consecutive "1"s. The second counter circuit is so constructed to output a second detection signal $55_2$ for detecting 7 consecutive bits when the exclusive OR circuit 51 inverse outputs 6 consecutive "1"s.

The first detection signal $55_1$ and the second detection signal $55_2$ are input to the selection channel control circuit 28 shown in FIG. 1, respectively. Based on these signals, the selection channel control circuit 28 determines if the channel being extracted by the decision circuit $26_{L+1}$ is the reference channel as well as distinguishing one reference channel from another.

Figure 5:
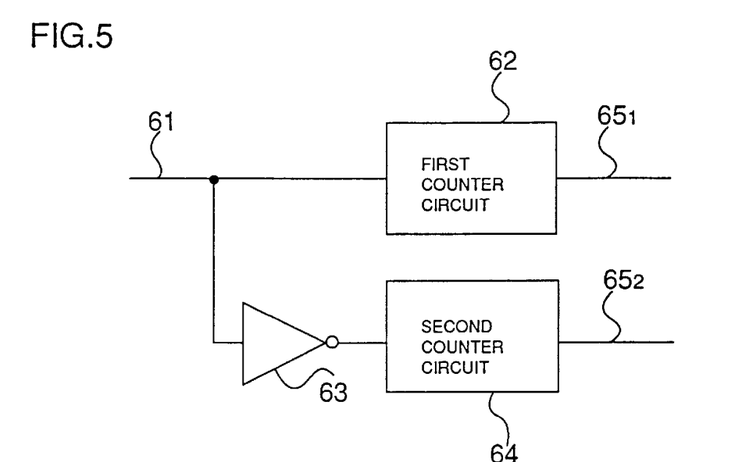
FIG. 5 is a block diagram of a coding method detection circuit for detecting a reference channel by using a mark ratio.

FIG. 5 is a block diagram of a construction of the coding method detection circuit 27 for detecting the reference channel based on the mark ratio.

In this case too, it is assumed that two reference channels are set in N channels by the reference channel coding circuit $15_1$ and the reference channel coding circuit $15_2$.

The 8B10B coding has a forbidden rule specifying limitation of the mark ratio in 10 bits ranging from 4/10 to 6/10. The coding method of the first reference channel is set to have the mark ratio of 7/10 or more. The coding method of the second reference channel is set to have the mark ratio of 3/10 or less.

The first reference channel code is expressed as follows:

"1110011110".

The second reference channel code is expressed as follows:

"0001100001".

It is to be noted that channels other than the reference channels are coded with 8B10B coding.

A signal 61 extracted by the decision circuit $26_{L+1}$ is branched and input to the first counter circuit 62 and the inverse circuit 63, outputs of the inverse circuit 63 are input to the second counter circuit 64.

The first counter circuit 62 counts up when the data signal 61 is "1". The second counter circuit 64 counts when the data signal 61 is "0". In the first and the second counter circuits 62 and 64, count values are initialized by a reset circuit (not shown) at every incoming 10 bit of the data signal 61.

When the mark ratio is 7/10 or more, the first counter counts 7 or more before initialization. The first counter is constructed to output a first detection signal $65_1$ at a time of counting 7 or more.

When the mark ratio is 3/10 or less, the second counter counts 7 or more before initialization. The second counter is constructed to output a second detection signal $65_2$ at a time of counting 7 or more.

The first detection signal $65_1$ and the second detection signal $65_2$ are input to the selection channel control circuit 28 shown in FIG. 1, respectively. Based on these signals, the selection channel control circuit 28 determines if the channel extracted by the decision circuit $26_{L+1}$ is the reference channel as well as distinguishing one reference channel from another.

If the mark ratio is 7/10 or more, the coding method detection circuit 27 shown in FIG. 5 can detect that the channel is the first reference channel, so it is allowed for sufficient detection compared with the case requiring complete conformity of the bit pattern. This tolerates a certain degree of code error occurring on the transmission path.

Figure 6:
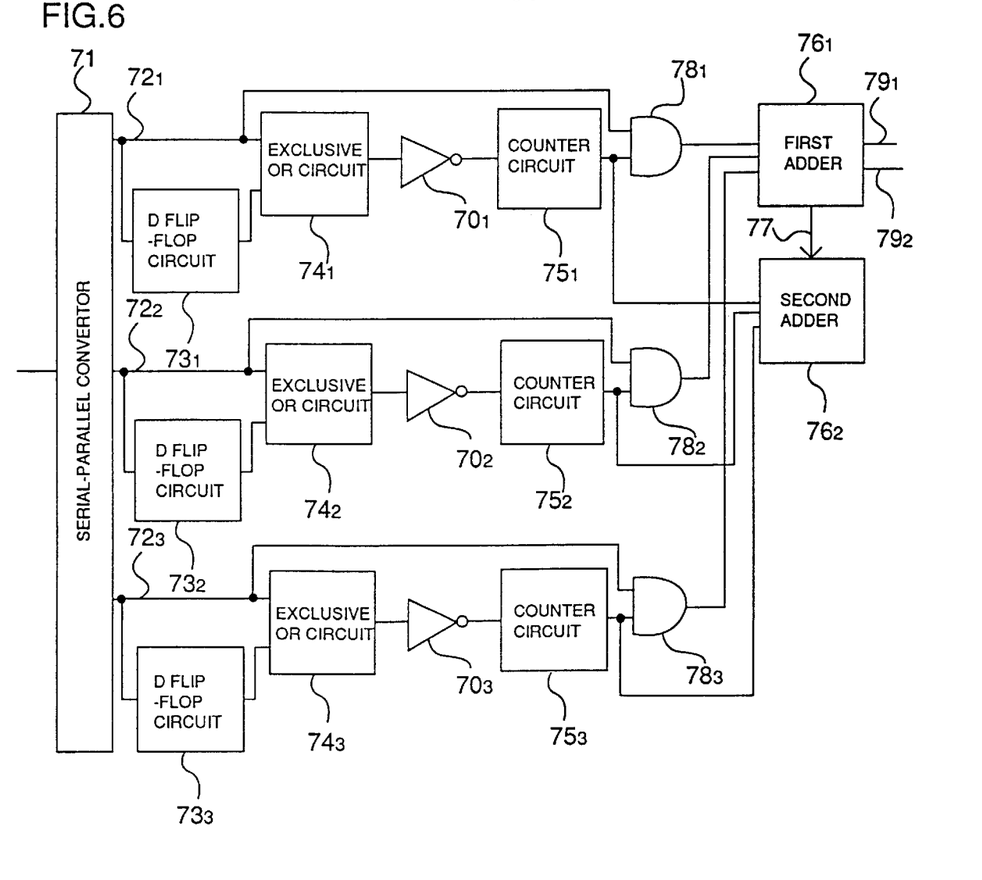
FIG. 6 is a block diagram of a construction of a coding method detection circuit for detecting a reference channel by using both mark ratio and bit pattern.

FIG. 6 is a block diagram of the coding method detection circuit 27 for detecting the reference channel by using combination of the mark ratio and bit pattern.

In this case too, it is assumed that two reference channels are set in N channels by the reference channel coding circuit $15_1$ and the reference channel coding circuit $15_2$. Data of both the first and the second reference channels are repetition of a fixed 3 bit pattern. The bit pattern of the first reference channel is "100". The bit pattern of the second reference channel is "101".

It is to be noted that channels other than the reference channels are coded with 8B10B coding.

The data signals of one channel which have been extracted by the decision circuit $26_{L+1}$ in FIG. 1 are input to a serial-parallel convertor 71. The serial-parallel convertor 71 serves to convert incoming data signal of serial type into parallel signals of 3 bits. The serial-parallel converted data signals $72_1$ to $72_3$ are input to the D flip-flop circuits $73_1$ to $73_3$ and the exclusive OR circuits $74_1$ to $74_3$, respectively. The exclusive OR circuits $74_1$ to $74_3$ are connected to inverse circuits $70_1$ to $70_3$, respectively. As FIG. 3 shows, the D flip-flop circuits $73_1$ to $73_3$ and the exclusive OR circuits $74_1$ to $74_3$ serve to detect continuity of the same value.

Outputs of the inverse circuits $70_1$ to $70_3$ are input to counter circuits $75_1$ to $75_3$. Outputs of the counter circuits $75_1$ to $75_3$ are input to a first adder $76_1$.

The first adder $76_1$ is so constructed to output an enable signal 77 to a second adder $76_2$ when all values of incoming signals are equivalent to "1". Data signals $72_1$ to $72_3$ after serial-parallel converting and output signals of the counter circuits $75_1$ to $75_3$ corresponding to these signals are input to AND circuits $78_1$ to $78_3$.

Outputs of the AND circuits $78_1$ to $78_3$ are input to the second adder $76_2$. The second adder $76_2$ is constructed to output the first detection signal $79_1$ when added result is "1" and to output the second detection signal $79_2$ when added result is "2".

When the reference bit pattern is input petition of 3 bit pattern is input to the serial-parallel convertor 71, the respective bit values after serial-parallel converting are output of consecutive constant values. The channel data other than the reference channels may have repetition of 3 bit pattern. However, limitation of the mark ratio range defined by the forbidden rule prevents occurrence of 7 or more consecutive 3 bit patterns. For example, 7 consecutive 3 bit patterns such as "100", "100", "100", "100", "100", "100" and "100" make the mark ratio 1/3, which deviates from the forbidden rule specifying the mark ratio of 4/10 or more. If the counter circuits $75_1$ to $75_3$ detect the same consecutive values 7 or more times, such signal can be determined as the reference channel.

When the counter circuits $75_1$ to $75_3$ detect 7 or more consecutive bit patterns, the first adder $76_1$ outputs an enable signal 77. At this time, outputs of the counter circuits $75_1$ to $75_3$ are logical multiplied with the respective bit values after serial-parallel converting through AND circuits $78_1$ to $78_3$. Therefore outputs of the AND circuits $78_1$ to $78_3$ become "1" in case of "1" bit of the data values only.

As for the first reference channel having 3 bit pattern of "100", adder result of the second adder becomes "1". As for the second reference channel having the bit pattern of "101", added result of the second adder becomes "2".

The reference channel is determined dependent upon the added result. This circuit requires no reset circuit at every 10 bits, which has been used in the circuit for identifying only the mark ratio shown in FIG. 5.

The following is an explanation of the reference channel coding circuit $34_{K+1}$ to $34_L$ in case the reference channel contains data other than identification information.

In this case too, it is assumed that two reference channels are set in N channels by the reference channel coding circuit $15_1$ and the reference channel coding circuit $15_2$ and data are coded with the following coding method.

When identifying the reference channel by means of the forbidden rule specifying the maximum number of the code continuity, 2 bit data are contained in the code by making bit construction of the first reference channel as follows:

"1111110DD0".

The "D" refers to transmission data taking the value either "1" or "0". The number of the code continuity is "6". The second reference channel specifies the number of the code continuity to "7" having its bit construction as follows:

"1111111DD0".

In the bit pattern of the first reference channel, "0" follows 6 consecutive "1"s. This is because if the data "D" taking the value "1" is placed in the "0" position, the bit construction cannot be distinguished from that of the second reference channel.

Figure 7:
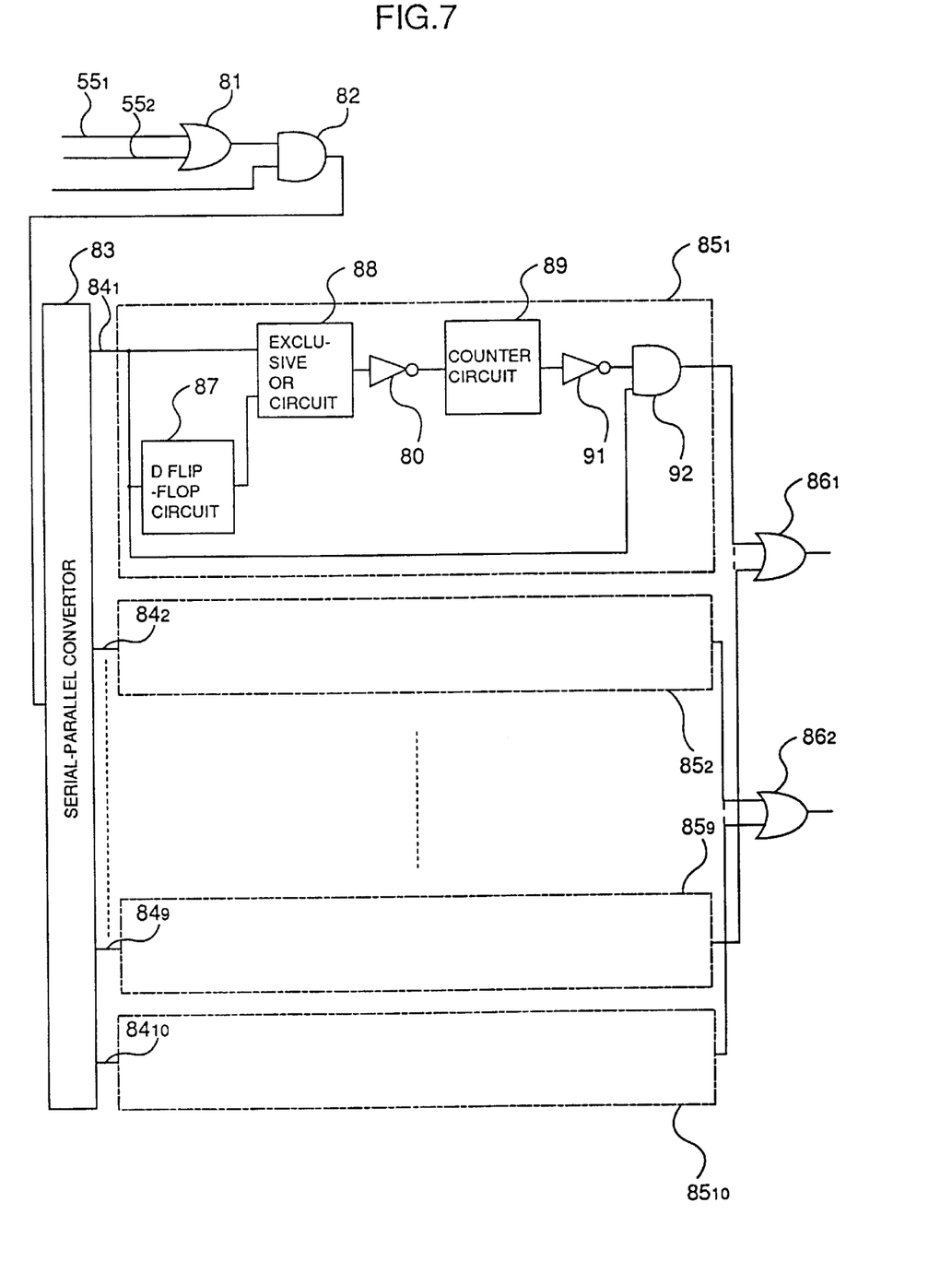
FIG. 7 is a block diagram of a construction of a coding method detection circuit for detecting a reference channel by using the maximum run length and for extracting data contained in the code.

FIG. 7 is a block diagram of a construction of the reference channel coding circuit $34_{K+1}$ to $34_L$ for detecting the reference channel based on the maximum run length as well as extracting the data contained in the code.

Bit constructions of the first and the second reference channels are provided with 2 bit data, which are the same as those aforementioned. In this circuit, the first detection signal $55_1$ and the second detection signal $55_2$ that are output from the coding method detection circuit 27 shown in FIG. 4 are input to the first OR circuit 81.

The first detection signal $55_1$ and the second detection signal $55_2$ are input to the first OR circuit 81. The first detection signal $55_1$ and the second detection signal $55_2$ are input to the selection channel control circuit 28 shown in FIG. 1, respectively.

Output of the first OR circuit 81 and the data signals extracted by the decision circuit $26_{L+1}$ shown in FIG. 1 are input to the first AND circuit 82. Output of the first AND circuit 82 is input to a serial-parallel convertor 83 and serial-parallel converted therein. Signals $84_1$ to $84_{10}$ corresponding to the respective bits after serial-parallel converting are input from the first to the tenth non-continuity detection circuits $85_1$ to $85_{10}$, respectively.

The non-continuity detection circuits $85_1$ to $85_{10}$ have the same construction. The construction of the non-continuity detection circuit $85_1$ is, thus represented.

The second OR circuit $86_1$ receives output signals of the non-continuity detection circuits in the order of odd numbers, $85_1$, $85_3$, $85_5$, $85_7$ and $85_9$.

The third OR circuit $86_2$ receives output signals of the non-continuity detection circuits in the order of even numbers, $85_2$, $85_4$, $85_6$, $85_8$ and $85_{10}$.

The second and the third OR circuits $86_1$ and $86_2$ output 2 bit data contained in the respective 10 bits. The first non-continuity detection circuit $85_1$ comprises the D flip-flop circuit 87, exclusive OR circuit 88, counter circuit 89, inverse circuit 91 and AND circuit 92. The D flip-flop circuit 87, exclusive OR circuit 88 and the counter circuit 89 function in detecting continuity of each bit in the same manner as the circuit components shown in FIG. 6, respectively.

Outputs of the counter circuit 89 are input to the inverse circuit 91 which serves to output "1" when each bit is detected to lack continuity.

Outputs of the inverse circuit 91 and data signals $84_1$ after serial-parallel converting are input to the AND circuit 92. Therefore the data signal $84_1$ is input to the OR circuit through the AND circuit 92 only when it lacks continuity.

Lack of continuity in the bit represents that this bit corresponds to the data bit of the 10 bit construction of the reference channel. The data bits as consecutive 2 bits are contained in the 10 bits. Odd numbered bits and even numbered bits are separated and input to the first OR circuit $86_1$ and the second OR circuit $86_2$, respectively, thus extracting the data bits.

This circuit determines if the data bits present depending on the presence/absence of continuity. Even if the first bit of the 10 bit is input to any one of non-consecutive detection circuits, the data bit can be extracted, requiring no synchronization in 10 bits. This case uses 2 data bits, however, 3 or more data bits are usable. In such a case, supposing that the number of the data bit is designated as "C" and the bit pattern length is designated as "B", "C" is expected to be a divisor of "B" and outputs are grouped at every "C" data bits by OR circuit.

This circuit can be used as the coding method detection circuit 27 if adding the circuit shown in FIG. 4 to the circuit shown in FIG. 7.

The following is an explanation on identification of the reference channel based on the mark ratio when 10 bit data construction contains the data bit.

In this case too, it is assumed that two reference channels are set in N channels by the reference channel coding circuit $15_1$ and the reference channel coding circuit $15_2$ and data are coded with the following coding method. It is to be noted that channels other than the reference channels are coded with 8B10B coding.

The first reference channel has its mark ratio of 7/10 or more. The second reference channel has its mark ratio of 3/10 or less. The first reference channel has the following bit pattern:

"1110D1111D".

The second reference channel has the following bit pattern:

"0001D0000D".

In this pattern, only one bit takes the fixed value "1" so as not to exceed the mark ratio of 3/10 even if both data bit "D"s become "1".

Figure 8:
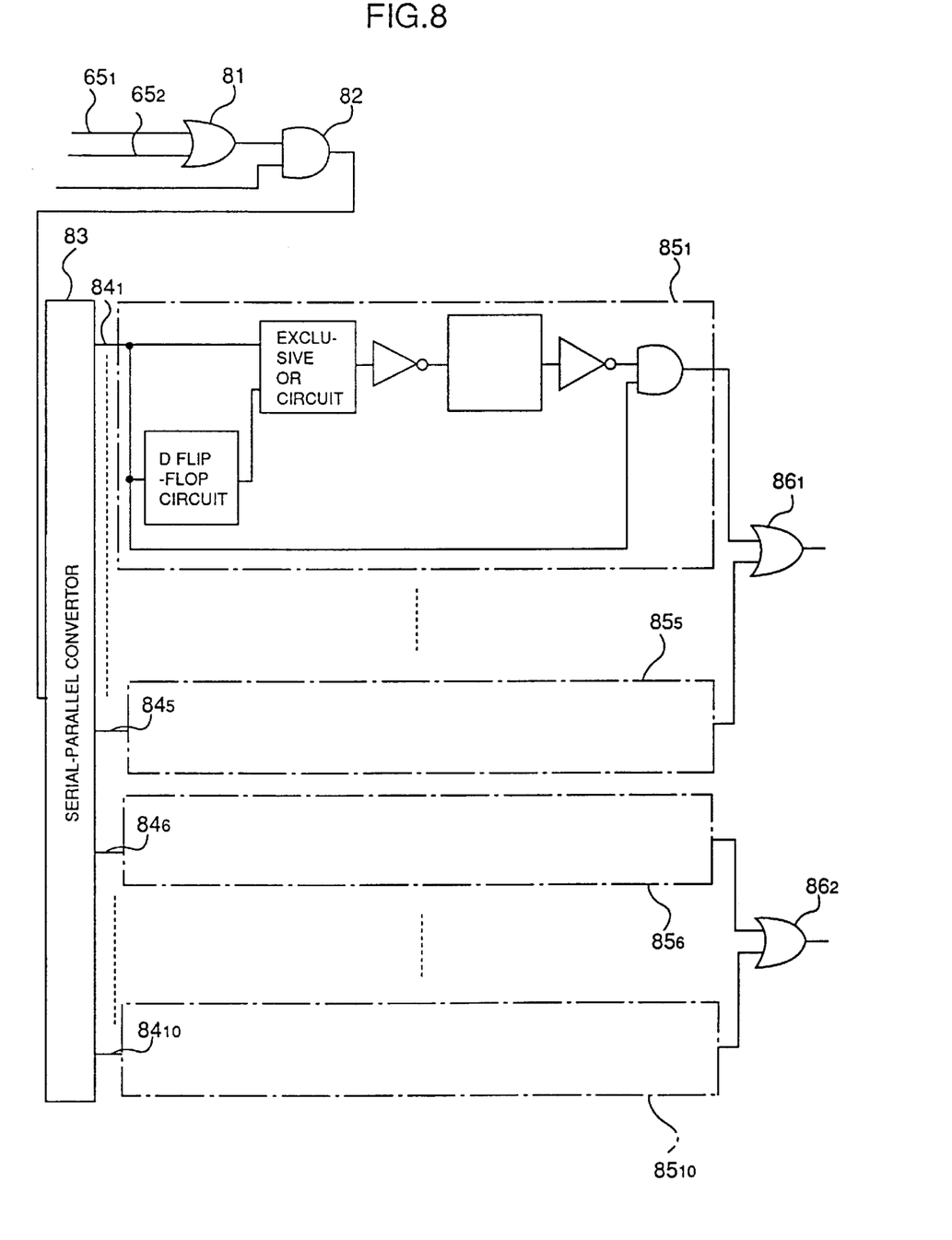
FIG. 8 is a block diagram of a construction of a coding method detection circuit for detecting a reference channel by using the mark ratio and for extracting data contained in the code.

FIG. 8 is a block diagram of a construction of the reference channel coding circuit $34_{K+1}$ to $34_L$ for detecting the reference channel based on the mark ratio and for extracting the data bit contained in the code.

The same parts as those shown in FIG. 7 are provided with the same numbers and explanations thereof are also omitted.

Where, the first detection signal $65_1$ and the second detection signal $65_2$ output from the coding method detection circuit 27 shown in FIG. 5 are input to the first OR circuit 81.

These detection signals $65_1$ and $65_2$ are also input to the selection channel control circuit 28 shown in FIG. 1, respectively.

This circuit has the same construction as that shown in FIG. 7 except that outputs from the first to the fifth non-consecutive detection circuits $85_1$ to $85_5$ are input to the second OR circuit $86_1$, and outputs from the sixth to the tenth non-consecutive detection circuits $85_6$ to $85_{10}$ are input to the third OR circuit $86_2$.

Since each data bit is positioned 4 bit apart, one data bit is ensured to locate from the first to the fifth bits and the other bit is ensured to locate from the sixth to the tenth bits. Therefore outputs of the non-consecutive detection circuits are divided into two groups, 1st to 5th and 6th to 10th and then input to the second and the third OR circuits $86_1$ and $86_2$, respectively, thus allowing to extract each data bit therefrom.

In the above case, the data bit is extracted from the reference channel by using the circuit of simple construction, requiring no synchronization in 10 bits. This embodiment assumes that data of 2 bits are contained in 10 bits, however, the number of bits is not limited to this. Supposing that the bit pattern length is "B", the number of the data bits becomes a divisor of the "B". If the data bits are separated at equal interval, dividing the bit pattern in equal cycle and inputting each output to the respective OR circuit enable extraction of the data bits. That is, supposing that the divisor is designated as "Y", bits grouped in the unit of B/Y are input to each OR circuit.

It is to be noted that this circuit can be used as the coding method detection circuit 27 if adding the circuit shown in FIG. 5 to the circuit shown in FIG. 8.

In the embodiment described so far, channels other than the reference channels are coded with the 8B10B coding. The bit patterns of the reference channels are set to be other than effective characters of the 8B10B coding, or set to deviate from the forbidden rule. However, any type of the coding method is available.

Also, the forbidden rule uses the mark ratio and maximum run length. It is obvious that other type of forbidden rules are also available.

The bit pattern of the reference channel is not limited to that specified in this embodiment. For example, such bit pattern as "011111100" may replace the pattern "111111000".

In this embodiment, each data bit locates 4 bits apart. The two consecutive bits can be used. In this case, bits are grouped into odd numbered and even numbered so that outputs of the respective non-continuity detection circuits are input to the corresponding OR circuits, as shown in FIG. 7.

In this embodiment, the specific channel is selected and extracted. However, it is possible to extract all channels so as to be adapted to the DEMUX (DE-MULTIPLEX) circuit.

This embodiment uses two reference channels. The number of the reference channel can be set to a desired value so far as each channel is identified by means of the forbidden rule or maximum run length. In case a plurality of reference channels are used, identification information to distinguish from one reference channel from another may be contained in the channel data. This embodiment is constructed to convert the multiplexed signal into an optical signal for transmission. However the electric signal can be transmitted without conversion.

What is claimed is:

1. A decoding circuit for decoding a fixed bit length transmission information having an identification bit string consisting of a continues repetition of one value of two values and data bit string consisting of a bit string made of said two values wherein a content of said bit string varies according to data to be transmitted, said decoding circuit comprising:

means for sequentially inputting said fixed bit length transmission information and parallel developing said bit strings of said fixed bit length transmission information;

a plurality of continuity detection means, each of said continuity detection means for sequentially inputting parallel converted bits and detecting whether a predetermined same value is continuously repeated in a certain times in said input bits; and means for extracting bits which are detected by said continuity detection means that a predetermined same value is not continuously repeated in a certain times in said input bits, and outputting said extracted bits as said data bit string.

* * * * *